US007789378B2

(12) United States Patent
Dittmar

(10) Patent No.: US 7,789,378 B2

(45) Date of Patent: Sep. 7, 2010

(54) PLATE SPRING WITH ADJUSTABLE SUPPORT CAM

(76) Inventor: Edbert E. L. Dittmar, 1386 E. Springdell Dr., Provo, UT (US) 84604

(*) Notice: Subject to any disclaimer, the term of this patent is extended or adjusted under 35 U.S.C. 154(b) by 370 days.

(21) Appl. No.: 10/946,279

(22) Filed: Sep. 21, 2004

(65) Prior Publication Data

US 2006/0061021 A1 Mar. 23, 2006

(51) Int. Cl.
*A47C 1/02* (2006.01)
*F16F 1/18* (2006.01)

(52) U.S. Cl. .................................... 267/160; 267/302.1

(58) Field of Classification Search .................. 267/47, 267/36.1, 260, 262, 263, 158–160, 165, 41, 267/136, 133, 132, 229, 230, 234, 242, 244, 267/7, 4, 247, 239, 302.1; 248/581, 585, 248/591, 628, 629, 630, 160, 372.1; 297/268.1, 297/198, 196, 302.1; 280/124.163, 124.174; 197/763–767
See application file for complete search history.

(56) References Cited

U.S. PATENT DOCUMENTS 1,433,246 A * 10/1922 Tacchi ......................... 267/41
1,998,508 A 4/1935 Kappenberg
2,378,499 A * 6/1945 Rapp .......................... 209/415
2,434,783 A 1/1948 Athey
2,440,172 A 4/1948 Gibbons
3,465,997 A * 9/1969 Piske ......................... 248/619
4,129,290 A * 12/1978 Popper ....................... 267/160
4,340,250 A 7/1982 Ward
4,538,882 A * 9/1985 Tanaka et al. ............... 359/824
4,801,019 A * 1/1989 Smolen, Jr. ................. 267/151
5,209,518 A 5/1993 Heckenliable et al.
5,222,709 A * 6/1993 Culley et al. ................ 248/421
5,505,521 A * 4/1996 Meiller et al. ............ 297/302.1
5,975,633 A * 11/1999 Walk et al. ............... 297/284.9
6,298,795 B1 * 10/2001 Suer ........................... 110/274
6,361,026 B2 3/2002 Reast
2003/0168788 A1 * 9/2003 Hon ........................... 267/136

FOREIGN PATENT DOCUMENTS

CN 227772 * 3/2002
DE 878132 * 6/1953
DE 019809908 A1 * 9/1999
GB 2238840 * 6/1991
JP 1-144222 * 6/1989
JP 7-302417 * 11/1995
JP 2000-258332 * 9/2000
SU 614984 * 7/1978
SU 0838167 * 6/1981 ................. 267/160

* cited by examiner

*Primary Examiner*—Christopher P Schwartz
(74) *Attorney, Agent, or Firm*—Thorpe North & Western LLP

(57) ABSTRACT

A spring system comprising flat plate-springs with one end mounted rigidly to an un-sprung first base and the opposite end mounted rigidly to a sprung second base. The spring system is fitted with cams as strain-control surfaces, mounted tangent to the plate springs and spaced progressively from the said plate-springs beginning at the tangency. The strain-control cams are movable to provide for adjustable spring rates, actively repositioned upon demand therein providing an adaptive active spring-rate system or suspension.

13 Claims, 3 Drawing Sheets

PLATE SPRING WITH ADJUSTABLE SUPPORT CAM

FIELD OF THE INVENTION

The present invention pertains to the field of constrained path plate-spring spring systems, or suspensions, in which a sprung portion of a mass is connected to an un-sprung portion of the said mass, by means of a resilient flat wide spring mechanism. This invention will find application in constrained path mechanical shock and vibration isolation spring mechanisms and suspensions.

PRIOR ART

Edbert E. L. Dittmar the inventor, applied for a patent in the year 2000, showing a suspension system with rigidly mounted plate-springs. Failures of the plate-springs in testing caused Dittmar to abandon this initial filing effort. Continued development work and testing has led to additional discoveries, which has made his invention viable. Thus, Dittmar is filing this new patent application.

No prior art, other than the inventor's previous development, relating to a bifurcated compliant spring systems was found.

It is the objective of this invention to provide for a simple, functional, plate-spring spring system, rigidly mounted on both ends, providing an inherent unidirectional, prescribed suspension path, and an adjustable, progressive and adaptive spring rate.

SUMMARY

This object is achieved with a bifurcated plate-spring system with strain control. Bifurcated, meaning that the flex of each plate-spring is divided into two equal but opposite flexing radii as the plate-springs are flexed into the shape of a serpentine. Strain Control is achieved by strain-control cams, mounted adjacent to the plate-springs rigid mounting lines, to progressively support loads placed on the spring system and distribute the strain over the length of the plate-springs.

In the said bifurcated spring systems, perpendicularly spaced or stacked flat plate-springs, under load, inherently flex into the shape of a serpentine with two equal but opposing radii. Flex-shear movement between plate-spring layers of the first radius is canceled by the opposing flex-shear movement in the second and opposing radius, resulting in equalization of shear to occur within the length of the two radii of the serpentine. With the shear movement equalized within the serpentine, the not flexed ends of these stacked plate-springs can be rigidly mounted to the un-sprung portion of a mass on one end, and to the sprung portion of the said mass on the opposite end.

Strain control cams or surfaces, mounted perpendicular, adjacent to the rigid mounting line, and spaced progressively apart from the plate-spring planes, control the strain exerted on the plate-springs under load, by distributing the load induced strain over the full length of each plate-spring controlled by the location and shape of the said cam.

The said plate-springs, being rigidly mounted on two ends, are flexible in a direction perpendicular to the surface of the plate-springs, but rigid in parallel directions to the said plate-springs. Thus, under load, the plate-springs flex, bifurcated, into a serpentine shape, inherently providing for a constrained unidirectional suspension travel path.

This invention further teaches a progressive spring rate. Strain control cams are mounted adjacent to the rigid mounting line, perpendicular and spaced progressively apart from the plate-spring surface, in such a way that, under a progressive load, said strain-control cams come progressively in contact with the plate-springs, and progressively support a portion of the load. Spring rate and the progression of the spring rate are thus determined by the position and shape of the said strain-control cams. The limiting of the deflection and thus the strain in the plate-springs, by the strain-control cams, inherently provides for a progressive spring rate.

This invention further teaches an adjustable, variably progressive, spring rate. This is achieved by providing a mechanism to change the relative positions and, or, the contours of the said strain-control cams. Varying the position and, or, contour of the said cams, varies the proportion of load the strain-control cams carry, which, in turn, varies the spring rate and spring rate progression.

This invention further teaches of an active adaptive spring rate control. This is achieved by outfitting the bifurcated spring system with sensors in communication with a control module. The said module converts input from sensors into a positioning command. The positioning command actuates a strain-control cam positioning mechanism, changing the relative positions and, or, contours of the said strain-control cams, and thus actively adapting the spring rate and spring rate progression of the spring system.

DETAILED DESCRIPTION OF THE INVENTION

Figure 1:
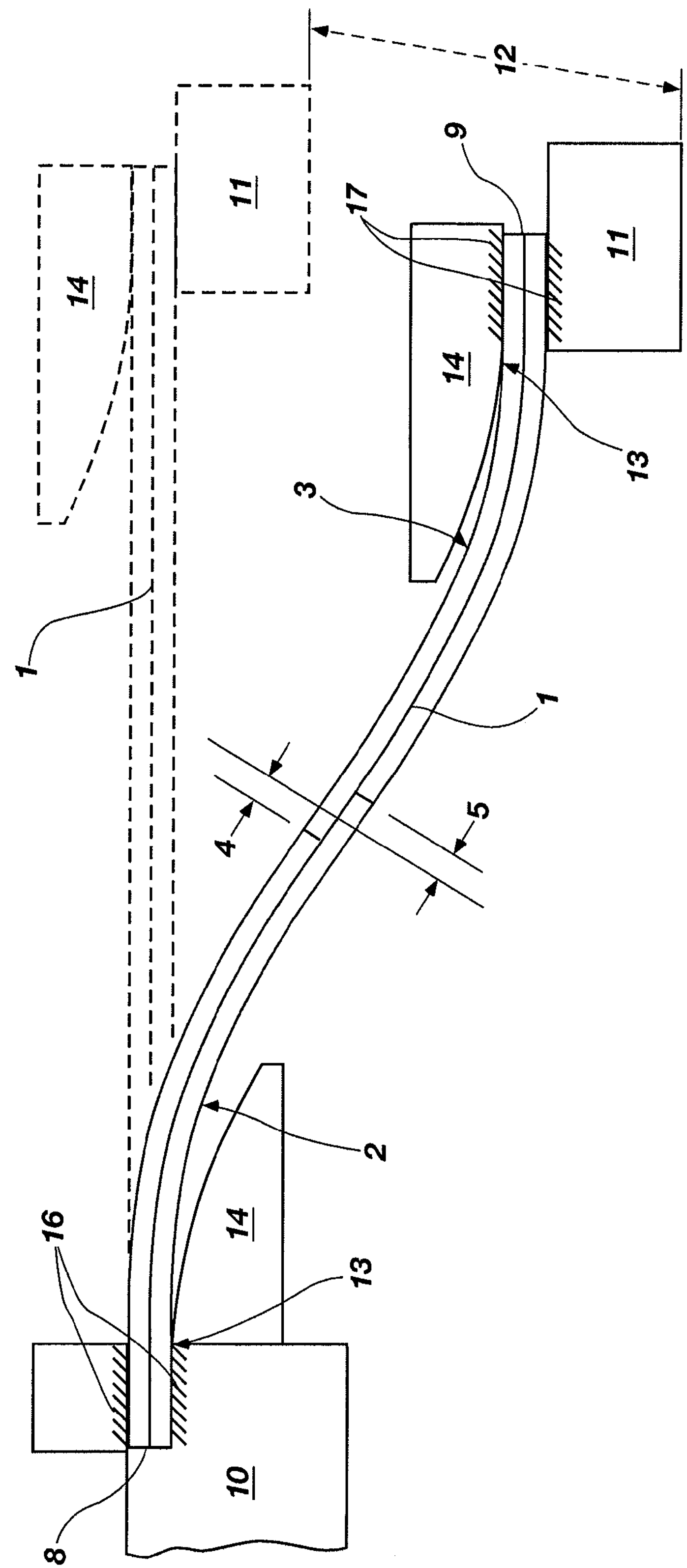
FIG. 1. A diagram showing the basic principle of a bifurcated spring system with its strain-control cam or surfaces, showing zero load (doted lines) and a load (solid lines).

It is the objective of this invention to provide a simple, flat plate-spring suspension system, with a constrained unidirectional suspension travel path, progressive spring rate, adjustable spring rate, and adaptive spring rate control. This objective is achieved by a bifurcated spring system of plate-springs, coupled with fixed or movable strain-control cams.

Flexing members of the spring system are made of flat wide plates of any type of resilient spring material referred to as plate-springs (1). The bifurcated spring system plate-springs (1), under load, flex into the shape of a serpentine of two separate and opposing radii (2 and 3). Shearing action (4 and 5) between plate-springs under load, are of opposing directions and are canceled within the two opposing radii (2 and 3). No shear action is propagated beyond the two opposing radii (2 and 3), allowing for rigid mounting of the plate-springs (1) on two opposing ends (8 and 9), with the first end mounted rigidly to the un-sprung portion of a mass (10) and the opposing end, rigidly mounted to the sprung portion of a mass (11).

With the ends mounted rigidly, the spring system inherently travels in a constrained, unidirectional path (12).

This invention further teaches that undesirable stress concentrations most dominant at each rigid mounting line (13) are eliminated by the use of strain control surfaces, or cams, (15 and 14) mounted adjacent to the mounting area (13), perpendicular, and spaced progressively apart from the plate-springs (1). Strain-control surfaces, or cams (14), mounted adjacent to the negative travel side of the said plate-springs (1), determine the strain distribution and thus the spring-rate in the negative flex direction, while strain-control cams (15), mounted adjacent to the opposite surface of the said plate-springs, determine the strain distribution and thus the spring-rate for the positive flex direction of the plate-springs.

This invention further teaches an adjustable, variably progressive, spring rate. This is achieved by providing movable strain-control surfaces (18), which change the relative contact positions between the plate-spring (1) and the strain-control surfaces (18). Varying the position and or contour of said strain-control cam segment (18), varies the proportion of load the support surfaces carry, which in turn varies the spring rate and spring rate progression.

This invention further teaches an active adaptive spring rate control. This is achieved by outfitting the bifurcated spring system (FIG. 2) with sensors (19) in communication with a control module (20). The said module (20) converts input from sensors (19) into a positioning command. The positioning command actuates a support cam positioning mechanism (21), which changes the relative positions and, or contours of said strain-control surfaces (18), thus actively changing the spring rate and spring rate progression of the spring system.

Figure 2:
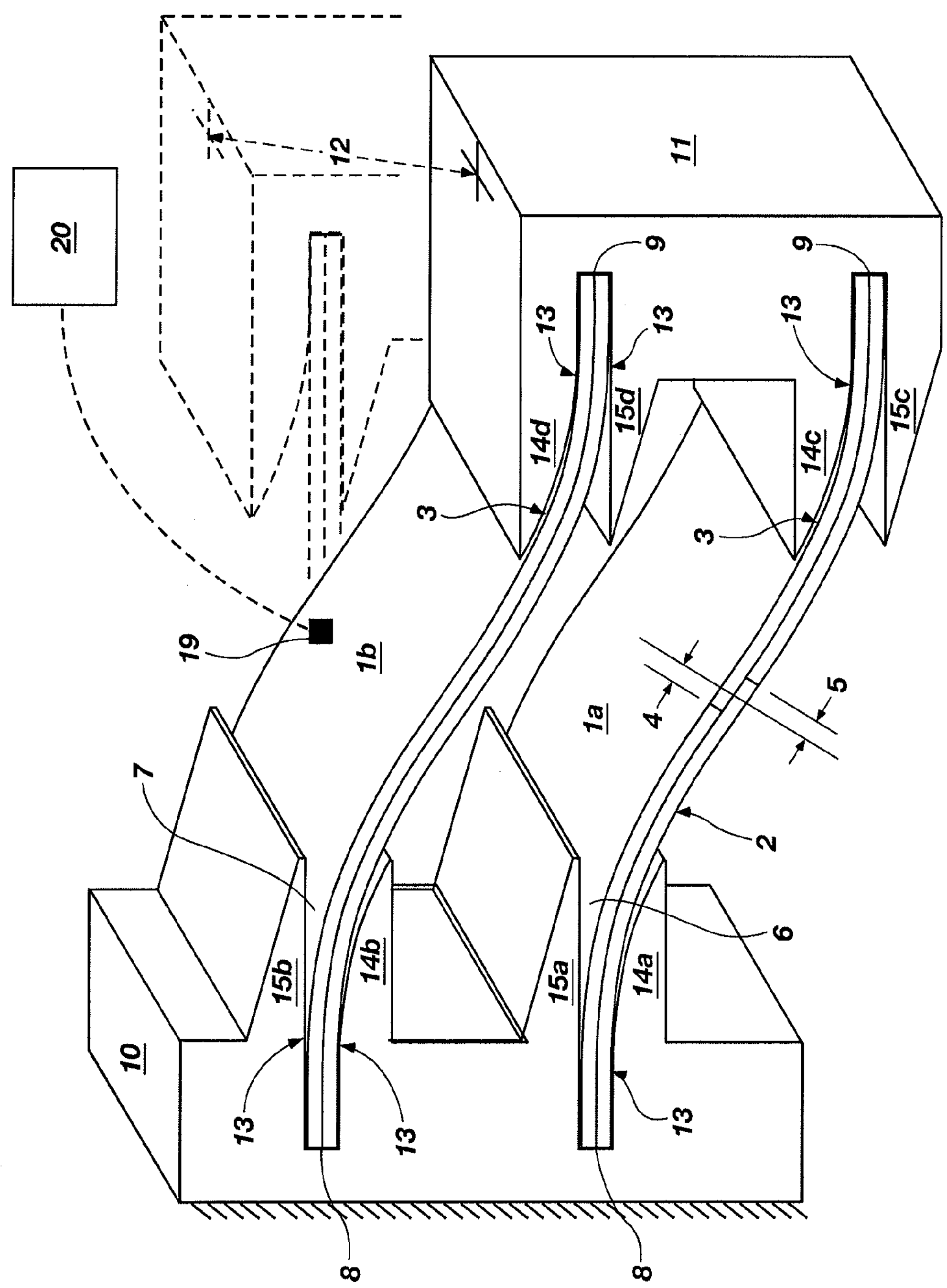
FIG. 2. A perspective view of a form of the bifurcated spring system, with two set of plate-springs, mounted perpendicularly apart, with fixed strain-control cam surfaces mounted adjacent to the mounting area, perpendicular and progressively apart from said plate-springs, showing the spring systems inherent shear equalizing serpentine shape of two equal opposing flex radii and the inherent unidirectional travel path. (Shown under load with solid lines, but indicating zero load position with doted lines.)

With specific reference to FIG. 2, a first plate spring (1*b*) is disposed between unsprung mass (10) and sprung mass (11). A second plate spring (1*a*) is also disposed between unsprung mass (10) and sprung mass (11) and above the first plate spring (1*b*). A first cam (15*b*) is disposed on a top surface (7) of the first plate spring (1*b*) and a second cam (15*a*) is disposed on a top surface (6) of the second plate spring (1*a*). A third cam (15*d*) is disposed about a bottom surface of the first plate spring (1*b*). A fourth cam (15*c*) is disposed about a bottom surface of the second plate spring (1*a*). A fifth cam (14*a*) is disposed about the bottom surface of the second plate spring (1*a*). A sixth cam (14*b*) is disposed about the bottom surface of the first plate spring (1*b*). A seventh cam (14*c*) is disposed about a top surface (7) of the first plate spring (1*b*). Finally, an eighth cam (14*d*) is disposed about a top surface (6) of the second plate spring (1*a*).

Figure 3:
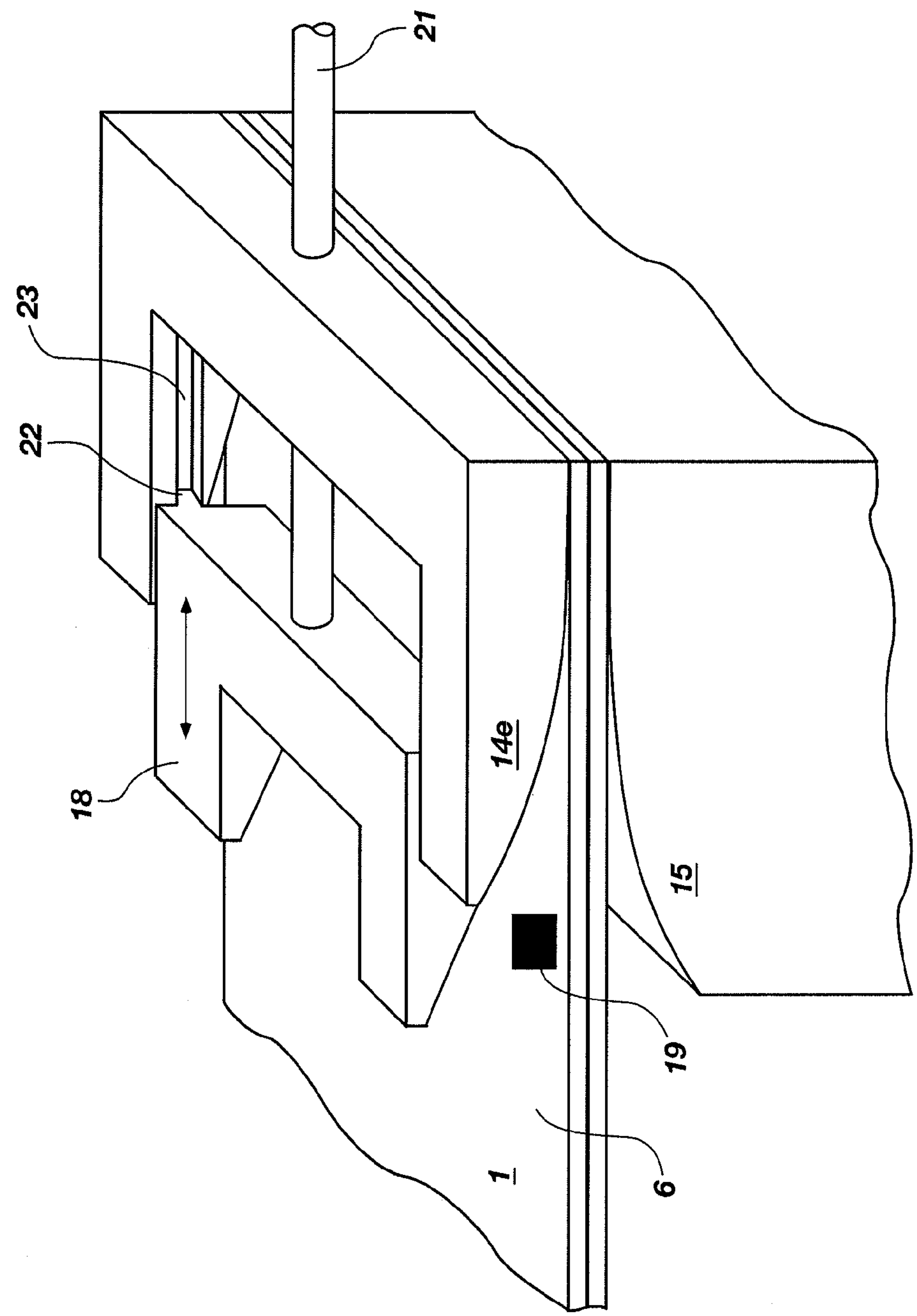
FIG. 3. A perspective view of one example of a movable and adjustable strain-control cam.

With specific reference to FIG. 3, cam (14) comprises a moveable portion (18) and a non-movable portion (14*e*). Moveable portion (18) comprises a tab member (22) configured to mate with groove (23) of the non-moveable portion (14*e*) of cam (14).

The invention claimed is:

1. A bifurcated spring suspension system, comprising:

a non-movable base;

a movable base disposed opposite the non-movable base;

a plate spring member comprising a first end and a second end, wherein the first end is disposed about the non-movable base and the second end is disposed about the movable base;

a first cam disposed about a bottom surface of the plate spring member and disposed about the non-movable base and a second cam disposed about a top surface of the plate spring member and disposed about the movable base, wherein said first and second cams comprise a cam contact surface tapering from tangent to the plate spring progressively away from the plate spring while said plate spring is in an unbiased position; and a sensor in communication with a control module, said sensor adapted to measure the strain induced on the plate spring member and communicate said measured strain to a control module, wherein said control module is adapted to adjust the horizontal position of at least one of the first and second cams to vary the strain measured on the plate spring member.

2. The bifurcated spring system of claim 1, further comprising a third cam disposed about a bottom surface of the second plate spring member and disposed about the movable base and a fourth cam disposed about a bottom surface of the first plate spring and disposed about the movable base, wherein said third and fourth cams comprise a cam contact surface tapering from tangent to the plate spring progressively away from the plate spring while said plate spring is in an unbiased position.

3. The bifurcated spring system of claim 2, wherein at least a portion of the third and fourth cams are fixedly attached to the movable base.

4. The bifurcated spring system of claim 1, wherein at least one of the first and second cams comprises a fixed member and a horizontally adjustable member.

5. The bifurcated spring system of claim 4, wherein the horizontally adjustable member is slidably attached to the fixed member.

6. The bifurcated spring system of claim 1, wherein the first and second cams comprise a fixed outer member and an adjustable inner member.

7. The bifurcated spring system of claim 1, wherein at least a portion the first and second cams are horizontally adjustable with respect to a surface of the plate spring member.

8. The bifurcated spring system of claim 1, wherein the tapering of the cam contact surface follows a variable radius path.

9. The bifurcated spring system of claim 1, wherein at least a portion the first and second cams are horizontally adjustable with respect to a top surface of the first plate spring.

10. The bifurcated spring system of claim 1, further comprising a third cam disposed about a top surface of the plate spring member and fixedly attached to the non-movable base.

11. A method of adjusting strain on a spring system, comprising:

(a) providing a spring system comprising:

a non-movable base and a movable base disposed opposite the non-movable base;

a plate spring member comprising a first end and a second end, wherein the first end is disposed about the non-movable base and the second end is disposed about the movable base;

a first cam disposed about a bottom surface of the plate spring member and disposed about the non-movable base and a second cam disposed about a top surface of the plate spring member and disposed about the movable base, wherein said first and second cams comprise a cam contact surface tapering from tangent to the plate spring progressively away from the plate spring while said plate spring is in an unbiased position; and a sensor in communication with a control module, said control module adapted to control movement of at least one of the first and second cams, (b) sending a signal from the sensor to the control module; and (c) adjusting the position of at least one of the first and second cams in response to said signal.

12. The method of claim 11, wherein the adjustment of the position of at least one of the first and second cams comprises adjustment of at least one of the first and second cams horizontally with respect to the plate spring member.

13. The method of claim 11, wherein the adjustment of the position of at least one of the first and second cams comprises adjustment of the contour of at least one of the first and second cams with respect to the plate spring member.

* * * * *